United States Patent [19]

Farrell

[11] Patent Number: 4,751,814
[45] Date of Patent: Jun. 21, 1988

[54] AIR CYCLE THERMODYNAMIC CONVERSION SYSTEM

[75] Inventor: William M. Farrell, Alplaus, N.Y.

[73] Assignee: General Electric Company, Schenectady, N.Y.

[21] Appl. No.: 747,552

[22] Filed: Jun. 21, 1985

[51] Int. Cl.$^4$ ............................. F02C 6/00; F02C 7/08
[52] U.S. Cl. ................................. 60/39.183; 60/39.511
[58] Field of Search ............. 60/39.183, 39.181, 39.15, 60/39.511

[56] References Cited

U.S. PATENT DOCUMENTS

| | | | |
|---|---|---|---|
| 2,341,490 | 2/1944 | Traupel | 60/39.183 |
| 2,482,791 | 9/1949 | Nettel et al. | 60/39.183 |
| 3,322,938 | 5/1967 | Weiss | 165/36 |
| 4,041,210 | 8/1977 | Van Dine | 429/16 |
| 4,163,910 | 8/1979 | Matthews | 310/11 |
| 4,244,191 | 1/1981 | Hendriks | 60/728 |
| 4,267,692 | 5/1981 | Earnest | 60/39.18 R |
| 4,305,460 | 12/1981 | Yampolsky | 165/179 |
| 4,449,569 | 5/1984 | Lisi et al. | 165/36 |
| 4,462,205 | 7/1984 | Giles | 60/39.02 |
| 4,516,628 | 5/1985 | Ward | 165/36 |
| 4,608,121 | 8/1986 | Ostman | 165/903 |

Primary Examiner—Louis J. Casaregola
Assistant Examiner—Timothy S. Thorpe
Attorney, Agent, or Firm—Jerome C. Squillaro

[57] ABSTRACT

An air cycle thermodynamic conversion system compresses a compressible gas in a multi-stage compression process with intercoolers between each adjacent pair of compressors. The intercoolers return the compressed gas temperature to about ambient temperature before each succeeding compression operation. The compressed gas is heated in a heat exchanger passing a heated exhaust gas in counterflow with the compressed gas to increase the thermal energy of thereof. A minimum temperature gradient is maintained between the heating compressed gas and the cooling exhaust gas by establishing the two flows such that they both have about equal heat capacities. The heated compressed gas is expanded in a turbine to produce at least enough torque to drive the multi-stage compression system. Additional torque may be produced in the turbine for driving a using process. Alternatively, an excess of heated gas, beyond that required for driving the turbine, may be fed directly to a using process. Further heat capture may make use of the effluent heated medium from the intercoolers as well as the exhaust from the turbine. In the preferred embodiment, the working gas in the compressors, intercoolers and turbine is air.

8 Claims, 9 Drawing Sheets

AIR CYCLE THERMODYNAMIC CONVERSION SYSTEM

BACKGROUND OF THE INVENTION

The present invention relates to thermodynamic conversion apparatus and, more particularly, to thermodynamic conversion apparatus employing air as a working medium.

Some thermodynamic conversion or chemical processes produce large quantities of hot byproduct gasses containing sufficient heat energy to make it economically attractive to collect and use the heat energy. For example, a gas turbine burns fuel with air in a combustor to produce hot gasses. The hot gasses are expanded in a turbine to produce torque. Part of the torque is used to drive an air compressor feeding compressed air to the combustor. The remainder of the torque is available on an output shaft.

Exhaust gasses exit the gas turbine at a temperature on the order of 1000 degrees F. When the hot exhaust gasses are vented to the atmosphere, the thermodynamic efficiency of such a gas turbine is quite low as compared to, for example, a steam turbine. Even with its relatively low efficiency, the rapid startup and flexible operation offered by gas turbines have encouraged its use as a prime mover for peaking power generation and in marine propulsion systems.

Heat recovery steam generators are commonly paired with gas turbines to form a steam and gas turbine combined cycle system. The heat recovery steam generator absorbs a substantial part of the heat energy in the exhaust gasses to produce steam which is available for use by any convenient using process. A combined cycle system of this sort has an overall efficiency which compares favorably with that of steam turbines.

A steam and gas turbine combined cycle system has a number of drawbacks. Steam is a difficult medium to contain and handle. For example, in order to avoid corrosion and scale in the water side of the heat recovery steam generator, the make-up water must be carefully treated to ensure its purity. Equipment for achieving such water purity is expensive. In addition, heat recovery steam generators are large devices requiring great capital investment and substantial real estate.

A heat recovery steam generator responds far more slowly to required changes in output than does the gas turbine. An extended period of, for example, two hours, is required for a cold start of the heat recovery steam generator during which output power is derived only from the gas turbine while the gas turbine exhaust heats the water in the heat recovery steam generator to operating temperature and pressure. A corresponding period of operation, without the benefit of output from the heat recovery steam generator, is required for shutdown. If the steam and gas turbine system is operated for 16 hours per day, during four of those hours, the gas turbine operates alone either to bring the heat recovery steam generator up to operating conditions, or to permit it to cool to its quiescent condition. Thus, although the start-up and operational flexibility offered by the gas turbine is retained, the improved efficiency and power output offered by a heat recovery steam generator is available for significantly less than its total operating time.

I have discovered that maximum thermodynamic efficiency is attained in absorbing heat from the hot gasses with a minimum thermal gradient between the medium giving up the heat and the medium receiving the heat. Steam generation necessarily requires a substantial regime where the medium on the water side of the heat exchange remains at a constant temperature while the water evaporates to steam. This process violates the above rule about minimum thermal gradient and thus degrades the amount of energy which can be absorbed from the hot gasses and delivered to a using process.

Numerous manufacturing and chemical processes require a plentiful supply of hot, compressed, unvitiated air. Unvitiated air is air whose oxygen has not been subjected to a combustion process wherein a substantial part of the oxygen is replaced by combustion products (usually including carbon dioxide, carbon monoxide, unburned fuel and, in the case of solid-fuel combustion, with fuel, ash and slag particulates.) A steam and gas turbine combined cycle system does not make such a supply of unvitiated air available without requiring separate hardware to produce it.

Stack gasses leave a steam and gas turbine combined cycle system at about 270 degree F. Although this represents a substantial energy waste, further heat recovery from the stack gasses conventionally is impractical due to the presence of corrosive compounds, principally sulfur compounds, which precipitate out of the gasses if their temperatures are reduced too far. An exhaust flow of heated air, on the contrary, requires no such temperature constraint. The temperature of heated air can be reduced as low as desired without suffering the consequences of precipitation of harmful compounds. At most, reducing the temperature of heated air permits the precipitation of water contained therein. Such precipitated water may be a valuable economic commodity in some environments.

OBJECTS AND SUMMARY OF THE INVENTION

Accordingly, it is an object of the invention to provide a combined cycle system including a gas turbine with a thermodynamic efficiency greater than that of the gas turbine alone, while retaining the operational flexibility of the gas turbine.

It is a further object of the invention to provide a combined cycle system which employs an air bottoming cycle for recovering heat energy in a useful form from a stream of heated gas.

It is a still further object of the invention to compress air in a multi-step compression process with intercooling between at least two of the compression steps. The intercooling cools the compressed air to as low a temperature as possible before it enters a heat exchange with a flow of hot gasses. The heat exchange is permitted to proceed with a minimum temperature gradient between the hot gas flow and the air flow for maximum heat-transfer efficiency. The minimum thermal gradient is enhanced by controlling the air mass flow rate to a value having a heat capacity substantially equal to the heat capacity of the hot gas.

It is a still further object of the invention to provide an air bottoming cycle including auxiliary burning to increase the heat energy in the heated compressed air.

Briefly stated, the present invention provides an air cycle thermodynamic conversion system in which a compressible gas is compressed in a multi-stage compression process with intercoolers between each adjacent pair of compressors. The intercoolers return the compressed gas temperature to about ambient temperature before each succeeding compression operation. The compressed gas is heated in a heat exchanger passing a heated exhaust gas in counterflow with the compressed gas to increase the thermal energy thereof. A minimum temperature gradient is maintained between the heating compressed gas and the cooling exhaust gas by establishing the two flows such that they both have about equal heat capacities. The heated compressed gas is expanded in a turbine to produce at least enough torque to drive the multi-stage compression system. Additional torque may be produced in the turbine for driving a using process. Alternatively, an excess of heated gas, beyond that required for driving the turbine, may be fed directly to a using process. Further heat capture may make use of the effluent heated medium from the intercoolers as well as the exhaust from the turbine. In the preferred embodiment, the working gas in the compressors, intercoolers and turbine is air.

According to an embodiment of the invention, there is provided a thermodynamic conversion system for absorbing heat from a flow of heated gasses comprising at least first and second air compressors for compressing ambient air, an intercooler between the at least first and second air compressors the intercooler including means for reducing a temperature of a first compressed air from the first air compressor to about an ambient temperature before the first compressed air enters the second air compressor, a heat exchanger including means for transferring heat from the flow of heated gasses to a second compressed air from the second air compressor to produce a heated compressed air, at least one air turbine responsive to the heated compressed air to drive at least one of the first and second air compressors, the heated compressed air including an excess of energy beyond that required by the at least one air turbine to drive the at least one of the first and second air compressors, and means for delivering the excess of energy to a using process.

According to a feature of the invention, there is provided a combined cycle system with an air bottoming cycle comprising a gas turbine, the gas turbine including means for producing a flow of hot gasses, a heat exchanger, first, second and third air compressors, means for connecting the first, second and third air compressors in tandem for compression of air, a first intercooler in the means for connecting disposed between the first and second air compressors, a second intercooler in the means for connecting disposed between the second and third air compressors, means associated with the first and second intercoolers for reducing a temperature of the air passing therethrough to about an ambient temperature, the heat exchanger including means for transferring heat from the flow of heated gasses to a compressed air from the third air compressor to produce a heated compressed air, at least one air turbine responsive to the heated compressed air to drive the first, second and third air compressors the heated compressed air including an excess of energy beyond that required by the at least one air turbine to drive the first, second and third air compressors, and means for delivering the excess of energy to a using process.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
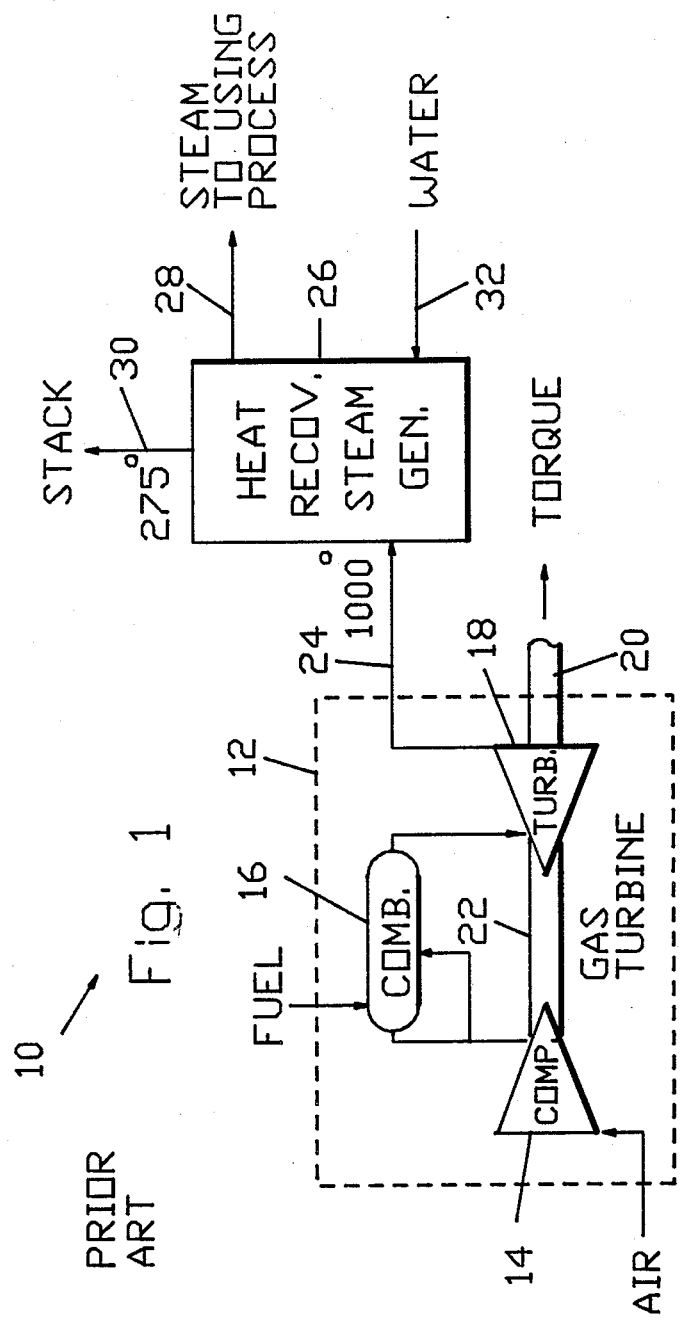
FIG. 1 is a schematic diagram of a steam and gas turbine combined cycle system according to the prior art.

Referring to FIG. 1, there is shown, generally at 10, a steam and gas turbine combined cycle system according to the prior art. A gas turbine 12 includes a compressor 14 effective to compress ambient air for reaction with fuel in a combustor 16. The hot gasses from combustor 16, including unreacted air and products of combustion, are applied to a turbine 18 wherein they are effective to produce an output torque on an output shaft 20, as well as to drive compressor 14 through an intershaft 22.

After expansion, the gasses exit turbine 18 at a temperature of about 1000 degrees F. on an exhaust conduit 24 which conveys them to a heat recovery steam generator 26. The hot gasses give up a substantial portion of their heat energy in heat recovery steam generator 26 to produce steam which is conveyed on a steam line 28 to a conventional using process. The using process which may be, for example, a steam turbine, steam turbine-generator or chemical process, is not of concern to the present invention and will not be further detailed. The hot gasses, with their temperatures now reduced to about 275 degrees F., are discharged to the atmosphere through a stack 30. Make-up water or condensed steam is admitted to heat recovery steam generator 26 through a water line 32.

One skilled in the art will be aware that heat recovery steam generator 26 may include numerous elements for improving its thermodynamic efficiency. Such elements may include, for example, feedwater heaters, recuperators and superheaters. All such elements are conventional and further description or illustration thereof would be superfluous.

Figure 2:
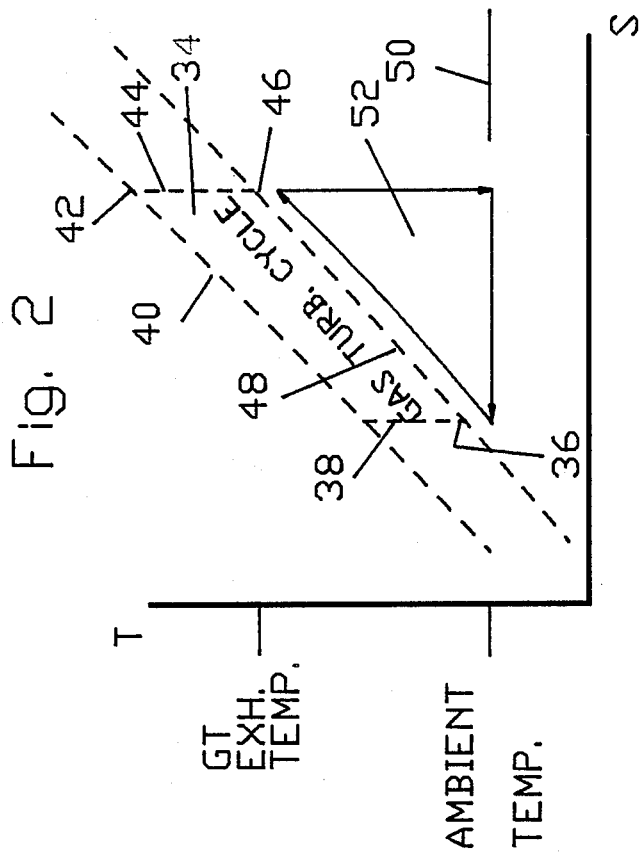
FIG. 2 is a theoretical temperature-entropy diagram to which reference will be made in describing an ideal bottoming cycle for a gas turbine.

Referring now also to FIG. 2, a temperature-entropy diagram of a gas turbine cycle 34 is shown in dashed line. The gas turbine takes in air at ambient temperature and pressure represented by a point 36. The air is adiabatically compressed (compressed without adding or subtracting heat) in compressor 14 along a vertical adiabatic compression line 38 during which its temperature and pressure are increased. Heat is added to the compressed air in combustor 16 along a constant pressure line 40 until the hot vitiated air, now containing products of combustion, exits combustor 16 at a point 42. The hot gasses are adiabatically expanded along a vertical adiabatic expansion line 44 until they reach the gas turbine exhaust temperature at an exhaust point 46. A constant pressure line 48 joining exhaust point 46 and point 36 closes gas turbine cycle 34.

As is well known, the area of gas turbine cycle 34 represents the thermal energy which the process develops. The total energy available from the expenditure of energy during compression and heating is the total area vertically between constant pressure line 48 and an ambient temperature line 50. This generally triangular energy-loss region 52, defined by ambient temperature line 50, constant pressure line 48 and an extension of vertical adiabatic expansion line 44, represents the energy not recoverable by the gas turbine system due to its high exhaust temperature. It is the purpose of a bottoming cycle to recover as much of the heat energy in energy-loss region 52 as possible.

Figure 3:
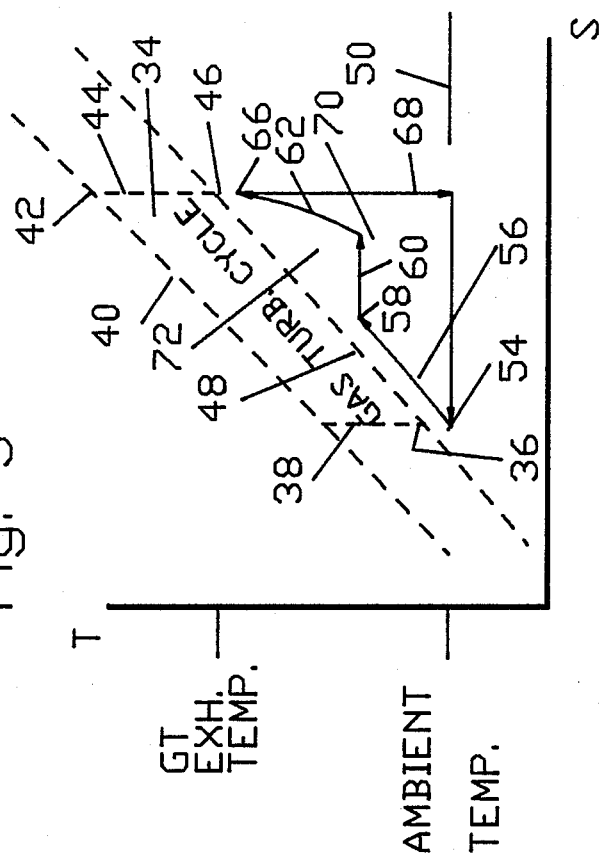
FIG. 3 is a temperature-entropy diagram for a bottoming cycle using a heat recovery steam generator.

A temperature-entropy diagram for a steam bottoming cycle is shown in FIG. 3. For purposes of visualization, water, and later steam, is flowed through a heat exchanger (heat recovery steam generator 26) in a direction opposite to the flow of hot gasses from gas turbine 12. The relationship between the temperature and entropy of the hot gas as it cools, and the temperature and entropy of the adjacent water or steam as it heats up, can be seen by the relationship of the steam lines and points to the nearby portions of constant pressure line 48.

Beginning at a low nearly ambient temperature and pressure at a point 54, water is pressurized and then heated along a water-heating line 56 until the water reaches its boiling point 58. The water increases its heat energy by boiling at a constant temperature along a constant temperature boiling line 60. Thereafter, the steam is rapidly superheated at a constant pressure along a line 62 until it reaches a temperature close to the gas turbine exhaust temperature at a point 66. The energy in the hot pressurized steam is expanded in, for example, a steam turbine (not shown) along a vertical adiabatic expansion line 68 until it reaches ambient temperature line 50. A final increment of cooling to ambient temperature line 50 may require heat rejection in a conventional condenser (not shown). For purposes of the present discussion, however, it is sufficient to assume that all of the energy in the steam at point 66 is recoverable. The figure is closed along ambient temperature line 50, which may represent heat rejection from the steam condensate at ambient temperature as occurs in a conventional condenser, to form a steam turbine bottoming cycle 70 representing the heat recovered from the gas turbine exhaust by the steam cycle.

It will be noted that a relatively poor fit is found at the interface between gas turbine cycle 34 and steam turbine bottoming cycle 70. That is, during the portion of steam turbine bottoming cycle 70 during which the water is converted to steam, a generally triangular gap 72 of unrecovered energy develops in the bottoming cycle. Thus, steam turbine bottoming cycle 70 is incapable of capturing substantially all of the energy in the gas turbine exhaust.

Figure 4:
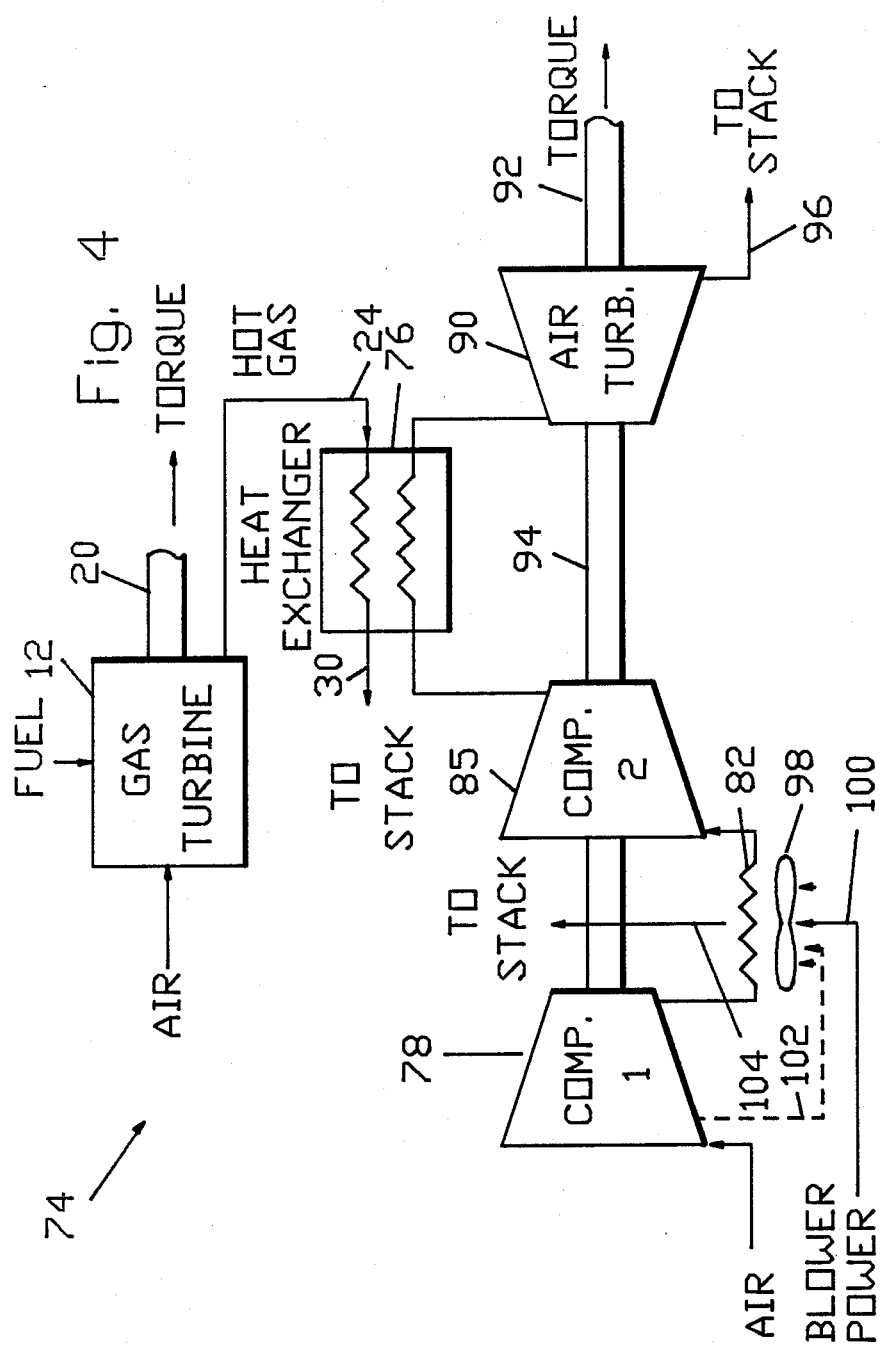
FIG. 4 is a simplified schematic diagram showing a combined cycle system with an air bottoming cycle employing two air compression stages having intercooling between the two compression stages.

I have discovered that many of the problems of heat recovery inherent in the steam bottoming cycle can be overcome using a gas, preferably air, as the working medium. Referring now to FIG. 4, a combined cycle system with an air bottoming cycle, shown generally at 74, conducts the hot gasses from gas turbine 12 on exhaust conduit 24 through a heat exchanger 76. A first compressor stage 78 compresses ambient air by a first compression multiple such as, for example, about two.

Figure 5:
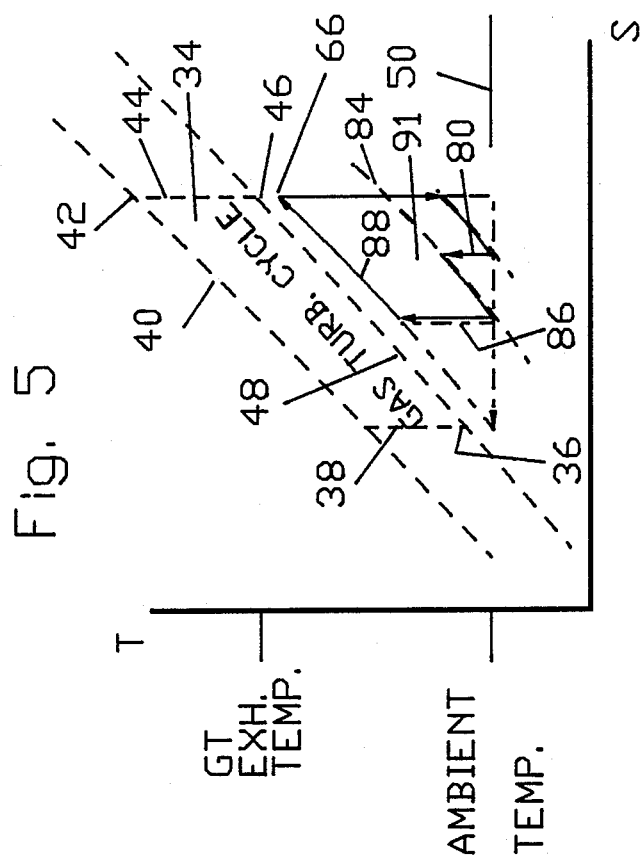
FIG. 5 is a temperature-entropy diagram of the combined cycle system of FIG. 4.

Referring now also to the corresponding temperature-entropy diagram in FIG. 5, first compressor stage 78 increases the temperature of the air along a vertical compression line 80. The compressed air is delivered from first compressor stage 78 to an intercooler 82 which returns the compressed air to approximately ambient temperature along a constant-pressure line 84. After intercooling, the compressed air is again compressed in a second air compressor 85 along a second vertical compression line 86 (FIG. 5) until its temperature approaches the corresponding temperature on constant pressure line 48.

The compressed air from second air compressor 85 is then counterflowed through heat exchanger 76 to absorb heat from the hot exhaust gasses from gas turbine 12. The heat exchanger portion of the cycle is represented by a constant pressure line 88. As the air exits heat exchanger 76, its temperature closely approaches that of the gas turbine exhaust. The heated compressed air is expanded in an air turbine 90 to complete closed air turbine cycle 91. Expansion of the heated air in air turbine 90 produces an output torque on an output shaft 92, as well as compressor torque on an intershaft 94 for driving first compressor stage 78 and second air compressor 85. Since the compressed air does not require an evaporation stage, its temperature, as it heats, remains close to the temperature of the hot gasses from gas turbine 12 as they cool. Thus, a relatively small temperature gradient exists between the heating air and the cooling gasses in heat exchanger 76.

I have discovered that the temperature gradient between the cooling gasses and the heating air can be minimized by establishing a flow rate of air at a value which has a total heat capacity substantially equal to the heat capacity of the hot gasses flowing in heat exchanger 76. To a first approximation, the heat capacities are equal when an equal mass flow rate of air and hot gasses is established. The temperature of the hot air leaving heat exchanger 76 can be within one-half of one percent of the temperature of the hot gasses entering it. That is, with a hot gas temperature of, for example, about 1050 degrees F., a hot air temperature of about 1000 degrees F. can be achieved.

Reasons other than optimizing heat transfer efficiency may require an air mass flow rate departing from this ideal, as will be described later in this disclosure.

After expansion in air turbine 90, the cooled air exits air turbine 90 on a stack line 96 at a temperature of, for example, about 450 degrees F. Since the air in stack line 96 is unvitiated and contains a substantial amount of residual heat, it is not necessary to discharge it to atmosphere without absorbing further heat therefrom. The exhaust air may be used in a chemical or industrial process such as, for example, in paper drying or as a source of air for a fluidized-bed combustion process. The exhaust air may even be applied to a further bottoming cycle using, for example, a steam generator.

Intercooler 82 conventionally requires forced means for removing heat from the air flow between first compressor stage 78 and second air compressor 85. This forced means is represented by a blower 98 which is driven by any convenient blower power source 100. Blower power source 100 may be, for example, electric power applied to an electric motor in blower 98. The electric power may be purchased but, if output shaft 92 is employed to drive an electric generator, using the electricity thus derived offers a particular advantage. That is, as combined cycle system with an air bottoming cycle 74 is started up, blower 98 is started up in concert therewith and produces a cooling airflow which may be made to vary automatically with the torque output of air turbine 90. Alternatively, blower power source 100 may be directly geared from output shaft 92 by conventional gearing means (not shown) whereby blower 98 is driven by direct mechanical connection at a speed proportional to the speed of output shaft 92.

A further alternative eliminates the need for blower 98 and blower power source 100 altogether by tapping off a supply of compressed air at an intermediate stage of first compressor stage 78 and using such tapped air as the forced means for encouraging cooling in intercooler 82. This is analogous to the supply of flowing air produced by the inlet fan of a fan-jet aircraft engine. This arrangement is suggested by a dashed line 102.

It will be recognized that a substantial increase in efficiency is achieved by using air tapped from first compressor stage 78 rather than using blower 98 with an electric or mechanical drive. In the case of the electric drive, the tapped air eliminates the inefficiencies of conversion of torque to and from electricity, as well as eliminates the substantial apparatus involved in blower 98. In the case of the direct geared mechanical drive, the tapped air eliminates the capital cost and inefficiency of such geared mechanical drives. The power consumed for performing the cooling in output shaft 92 is substantial, amounting to 500 kilowatts or more in a large machine. Accordingly, the elimination of blower 98, with its electric or mechanical drive, has a major impact on capital expenditure and operating cost.

The presence of heated air leaving intercooler 82 on a stack line 104 also should not be ignored as a source of recoverable energy. This heated air, although at only 160 or 170 degrees F., is clean, has no precipitation or corrosion problems and can be used in a chemical or industrial process without treatment. For example, the amount of intercooler air discharged by a commercial-sized combined cycle system with an air bottoming cycle 74 is capable of heating up to 3000 gallons per minute of water from ambient temperature to about 160 degrees using low-cost equipment. Thus, a low-cost, convenient source of a substantial quantity of hot water for domestic or industrial use is made readily available. Since the air is clean, it may be used directly for hot-air space heating.

The invention should not be considered to be limited to intercoolers using air as the heat-removal medium. Instead, any suitable intercooler technique may be employed. For example, an air-to-liquid intercooler may be employed for transfer of the heat from the air to a liquid, such as water. Evaporative, or any other type, of intercooling which is effective for reducing the temperature of the working medium should be considered to be contained within the scope of the invention.

Referring now specifically to FIG. 5, it will be noted that, although the top portion of air turbine cycle 91 along constant pressure line 88 closely follows constant pressure line 48, the bottom portion adjacent ambient temperature line 50 is serrated or scalloped, thus leaving an unrecovered portion of energy outlined in dot-dash line. This scalloped effect can be substantially reduced by increasing the number of compressors employed in the air-compression function and employing intercoolers between each adjacent pair of air compressors.

Figure 6:
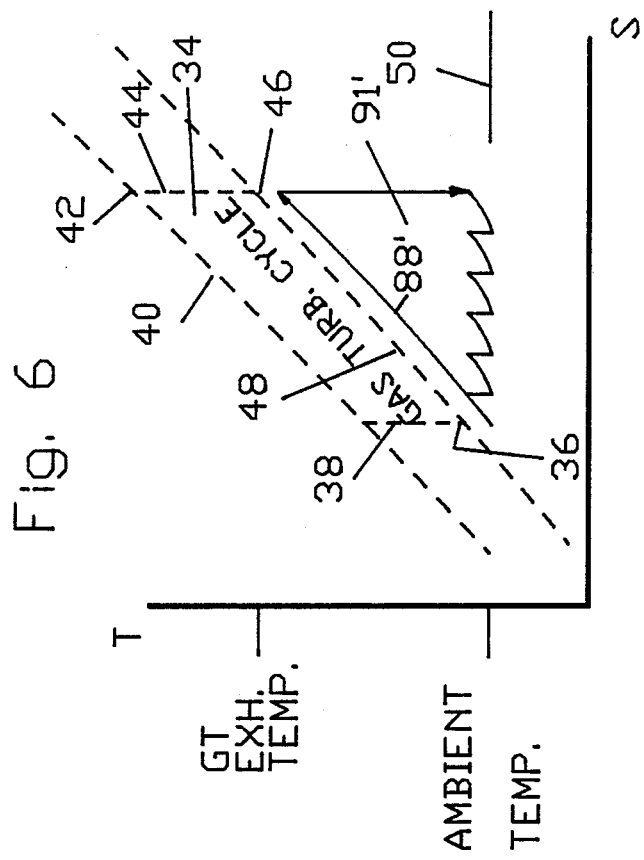
FIG. 6 is a temperature-entropy diagram of a combined cycle system in which the air bottoming cycle includes five air compression stages.

Referring to FIG. 6, for example, a modified air turbine cycle 91' is shown in which the compression task is performed by a sequence of five compressors with four intercoolers reducing the air temperature to about ambient temperature after each but the final compression. The larger number of compressors share the compression function, thus each provides a smaller proportion of the total pressure increase. It will be noted that the bottom portion of air turbine cycle 91' is a very good approximation of a fit with ambient temperature line 50 and thus almost all of the available energy unused by gas turbine cycle 34 is made available.

From a thermodynamic standpoint, it would appear that increasing the number of compressors and intercoolers increases the air cycle efficiency, however, from an economic standpoint, it must be recognized that the capital cost of added compressors, intercoolers, blowers and piping soon becomes unrecoverable in the decreasing marginal payoff from improved efficiency. In the preferred embodiment, three compressors employed in tandem with two intercoolers, one between each adjacent pair of compressors, appear to offer a satisfactory tradeoff between air-cycle efficiency and capital cost.

There is no requirement that the compression ratios of all compressors in a multi-compressor system be equal. On the contrary, compelling reasons urge the use of different compression ratios among the compressors. For example, the first and last compressors in a three-stage tandem compression system are likely to exhibit inferior efficiency compared to the intermediate stage. It is thus desirable to obtain a greater proportion of the total required compression from the intermediate compressor stage than from the first and last compressor stages. For example, if a total compression ratio of 20 is desired, improved overall compression efficiency may be achievable with a first and last stage compression ratio of about 2 and an intermediate-stage compression ratio of about 5.

Figure 7:
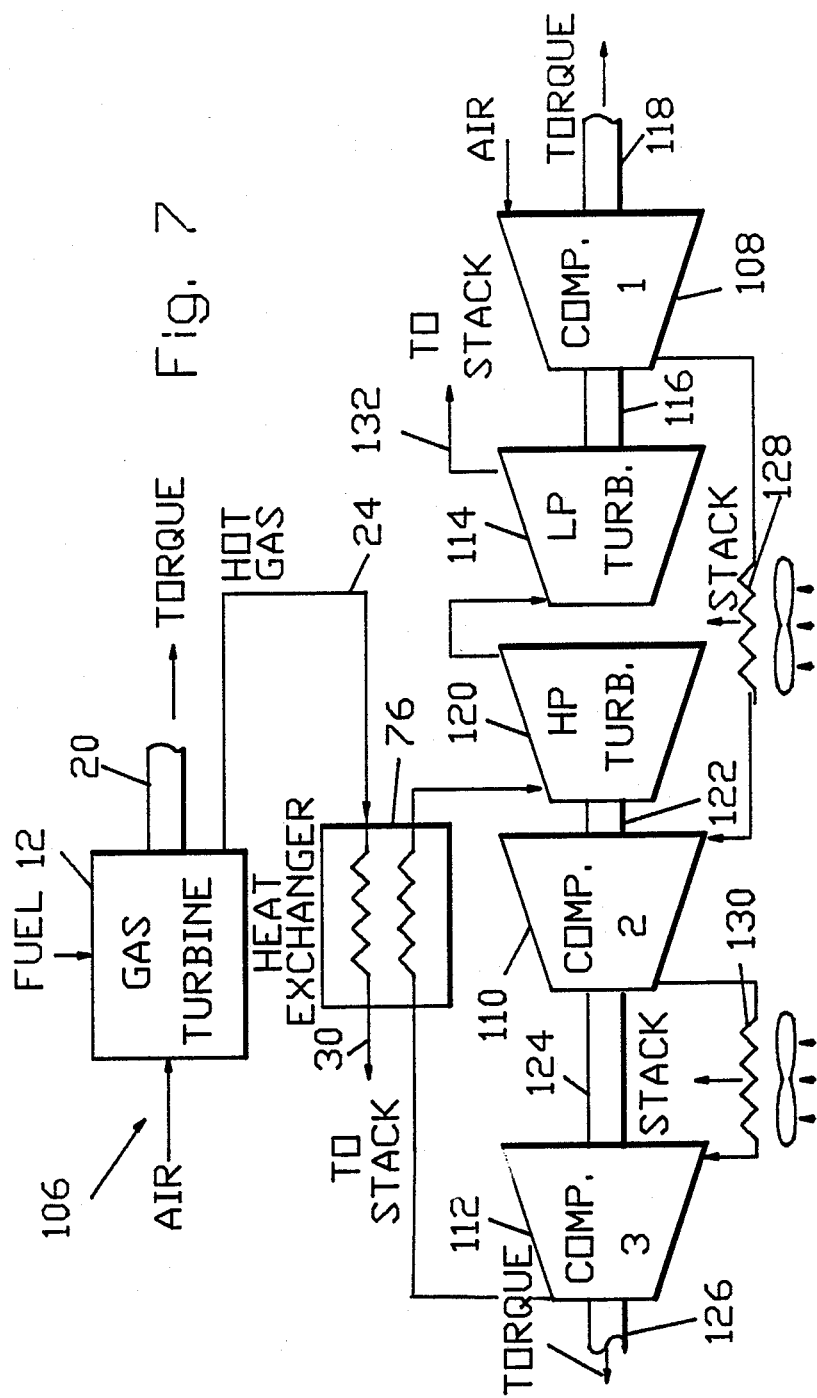
FIG. 7 is a combined cycle system with an air bottoming cycle having three air compressors with intercoolers and two air turbines driving separate output shafts and intershafts.

Referring now to FIG. 7, an embodiment of a combined cycle system with air bottoming cycle, shown generally at 106, in which three air compressor stages: a first air compressor stage 108, a second air compressor stage 110 and a third air compressor stage 112, are disposed in two separate groups. A low pressure air turbine 114 is coupled through an intershaft 116 to drive first air compressor stage 108 from which output torque is delivered to a load (not shown) on a first output shaft 118. A high pressure turbine 120 is coupled through an intershaft 122 to drive second air compressor stage 110 and a extension intershaft 124 to drive third air compressor stage 112. Output torque may also be delivered to a load (not shown) on a second output shaft 126.

Compressed air from first air compressor stage 108 is intercooled in a first intercooler 128 before being fed to second air compressor stage 110. Similarly, compressed air from second air compressor stage 110 is intercooled in a second intercooler 130 before entering its final compression in third air compressor stage 112. As in the preceding embodiment, the compressed air receives heat in heat exchanger 76 from the hot exhaust gases flowing therethrough. The compressed heated air undergoes a first expansion in high pressure turbine 120 to produce compressor drive for third air compressor stage 112 and second air compressor stage 110 as well as a first output torque. The air then undergoes a second expansion in low pressure air turbine 114 to produce compressor drive for first air compressor stage 108 as well as a second output torque. The clean exhaust air from low pressure air turbine 114 is conveyed on a stack line 132 to a stack or a downstream process which is capable of using the remaining heat.

The two-shaft system of FIG. 7 offers additional operating flexibility over a single-shaft system in which all compressors and air turbines are united on a common shaft. For example, third air compressor stage 112 and low pressure air turbine 114 can be relatively sized as desired to produce different shaft speeds and output torques. In fact, one or both of output shafts 118 and 126 may be omitted.

I have discovered that the apparatus of the present invention can be operated to increase or decrease the temperature of the gasses on stack 30 while changing the temperature of the hot air on stack line 132 in the opposite direction. That is, by selecting the pressure ratio used in pressurizing the air flowing through heat exchanger 76, more or less heat may be absorbed from the counterflowing hot gasses. If more heat is absorbed by the air, for example, then the exiting gasses are necessarily cooler.

Figure 8:
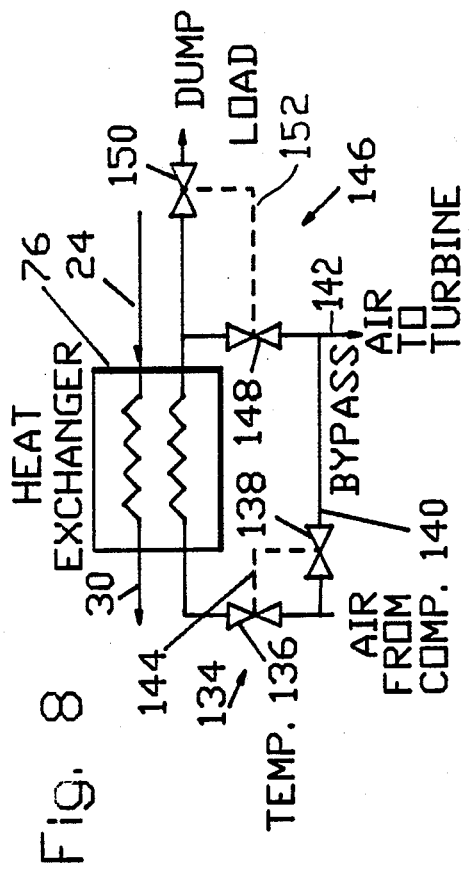
FIG. 8 is a closeup simplified schematic diagram of temperature and loading controls for the air bottoming cycles of the present invention.

A more sensitive control technique is shown in FIG. 8, to which reference is now made. This control technique is equally applicable to all embodiments of the invention. A temperature-control valve pair 134 includes a control valve 136 which controls the portion of the compressed air passing through heat exchanger 76. A bypass valve 138 controls the portion of the compressed air flowing in a bypass line 140 directly to a line 142 feeding the air turbine. By dividing the air flow between a portion which flows through heat exchanger 76 and a portion which bypasses heat exchanger 76, when these two flows are united in line 142, the temperature of the combined flow is controlled.

Control valve 136 and bypass valve 138 should be operated concertedly but in opposite directions. That is, as control valve 136 is opened a given amount, bypass valve 138 should be closed a corresponding amount. For greatest operational convenience, control valve 136 and bypass valve 138 are mechanically connected as indicated by a dashed line 144 to perform the desired coordination therebetween with a single adjustment of temperature-control valve pair 134.

Loading of the air turbine (FIG. 4 or 7) is controlled by a load-control valve pair 146 consisting of a load control valve 148 in series with the hot air from heat exchanger 76 and a dump valve 150 effective to dump hot air from the system whereby a larger or smaller volume of air is fed to the air turbine. The unused air is dumped or passed directly to a using process. Load control valve 148 and dump valve 150 are mechanically coupled 180 degrees out of phase, as indicated by a dashed line 152, for concerted actuation thereof in opposite directions by a single adjustment of load-control valve pair 146.

It would be clear to one skilled in the art that a substantial interaction exists between temperature-control valve pair 134 and load-control valve pair 146. That is, after an air temperature is established by adjustment of temperature-control valve pair 134, the ratio of hot to cold air which is fed to line 142 may be changed by adjusting the setting of load-control valve pair 146. Satisfactory coordination of the two sets of controls is fully within the abilities of a skilled operator having the benefit of the present disclosure, and is aided by measurements of conventional temperature, pressure and flow instrumentation which is not of interest to the present invention.

Control of temperature-control valve pair 134 and load-control valve pair 146 may be performed manually, or it may be performed by semi-automatic or fully automatic means which may be, for example, a part of an electric power generation plant control system. The apparatus used to perform such control is conventional, does not form an inventive part of the present invention, and is thus not further detailed.

Figure 9:
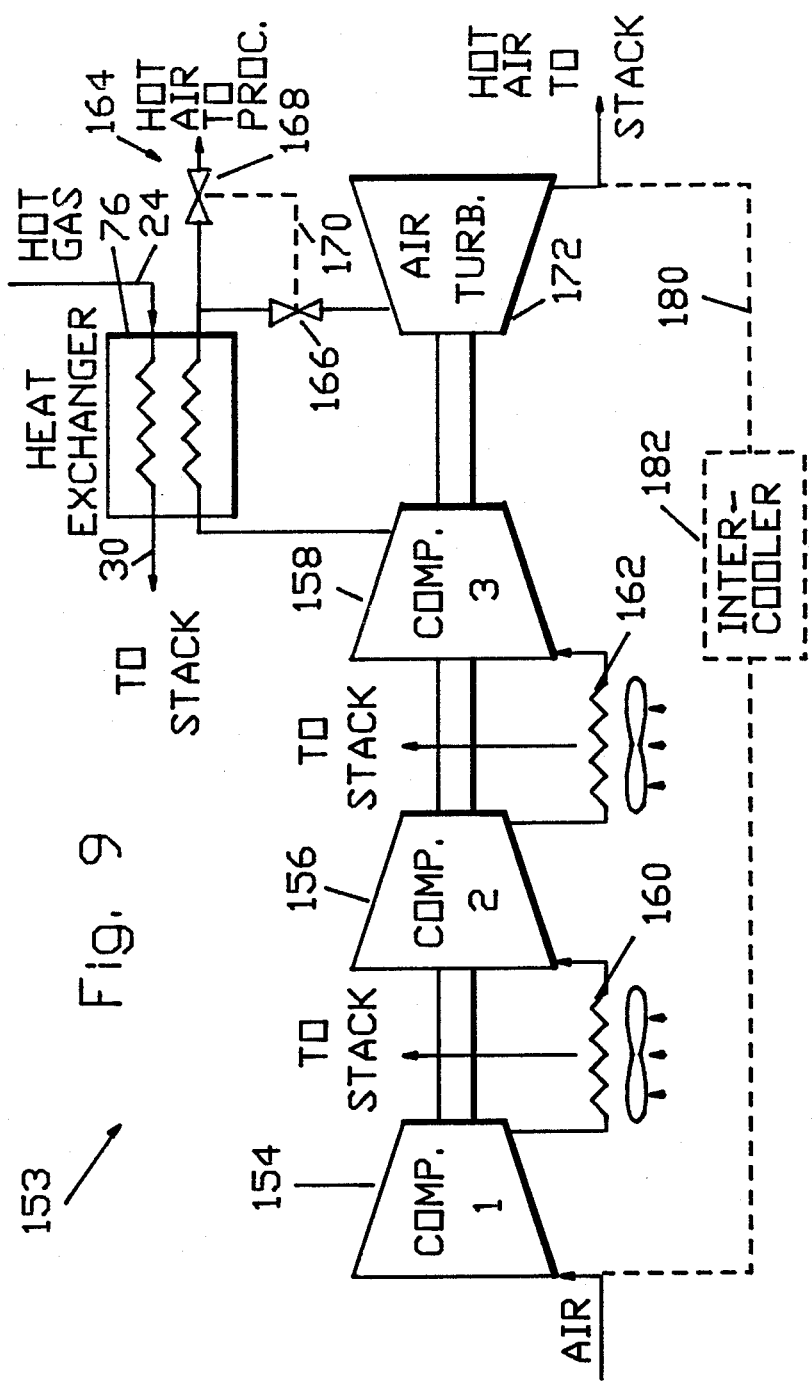
FIG. 9 is a simplified schematic diagram of a combined cycle system in which the principal output of the air bottoming cycle is compressed heated air.

A further embodiment of the invention, shown in FIG. 9, in which a combined cycle system with an air bottoming cycle 153 omits a torque output altogether in favor of maximizing a supply of hot, pressurized, air to a using process. A three-stage compression system consisting of air compressors 154, 156 and 158, with an intercooler 160 between air compressors 154 and 156, as well as an intercooler 162 between air compressors 156 and 158, feeds pressurized air through heat exchanger 76 to a control valve assembly 164. Control valve assembly 164 includes a turbine loading valve 166 and an output valve 168 which are preferably mechanically coordinated in opposite directions by a mechanical interconnection as indicated by a dashed line 170. Turbine loading valve 166 is effective for feeding heated pressurized air to an air turbine 172 which produces only enough torque to drive air compressors 154, 156 and 158 without additional torque to drive an output shaft. The principal output of combined cycle system with an air bottoming cycle 153 is hot, clean, pressurized air which is delivered through output valve 168 to a using process.

As is the case in all preceding embodiments, besides the principal output (hot, pressurized air in the embodiment of FIG. 9, torque in the other embodiments), the energy in the clean heated air streams from intercoolers 160 and 162 and from air turbine 172 may be recaptured.

Supplementary firing may be employed to increase further the output of any of the foregoing embodiments. Although supplementary firing consumes additional fuel, its provision adds a further measure of operating flexibility to the system. In addition, supplementary firing offers a simplified method for bringing the air cycle portion of the combined cycle system up to operating speed at which it is capable of producing a useful power output independently of the operating condition of the gas turbine portion of the combined cycle system. Supplementary firing may be performed on either the gas or air side of the system.

Figure 10:
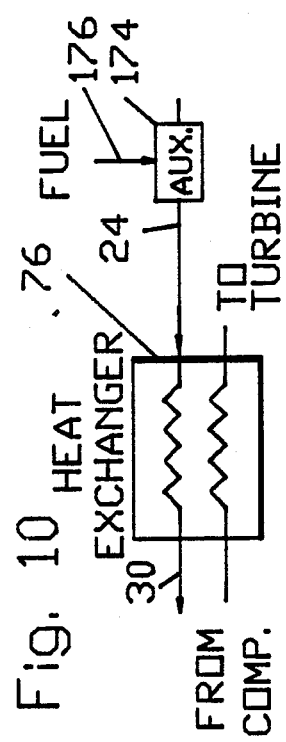
FIG. 10 is a closeup simplified schematic diagram of a heat exchanger of a combined cycle system illustrating auxiliary burning on the gas side of the heat exchanger.

Referring now to FIG. 10, auxiliary firing is illustrated on the gas side of the system. A conventional auxiliary burner 174 is interposed in exhaust conduit 24 on the gas-entry side of heat exchanger 76. A fuel line 176 delivers a fuel of any convenient type to auxiliary burner 174 for combustion therein. The heat transferable to the compressed air in the air side of heat exchanger 76 is the sum of the heat from the gas turbine on exhaust conduit 24 plus the heat added in auxiliary burner 174, less normal heat transfer inefficiencies in heat exchanger 76. Auxiliary burner 174 may be of a type capable of burning one or more of any available type of fuel including gaseous, liquid or solid. Combustion air for reacting the fuel may be available in the excess air from the gas turbine exhaust. Alternatively, auxiliary burner 174 may contain an air blower (not shown) for supplying combustion air. Auxiliary burner 174 may add heat to the exhaust gasses entering heat exchanger 76 during all operating conditions of the overall system, or only during selected periods when the additional heat is required. It is believed that a suitably sized auxiliary burner 174 may be capable of doubling the output power of the air cycle portion of the combined system.

Figure 11:
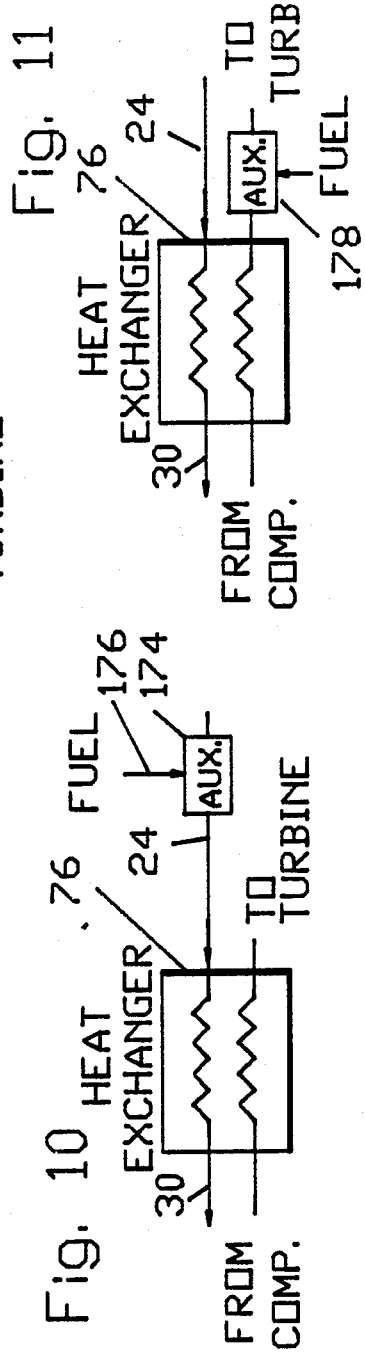
FIG. 11 is a closeup simplified schematic diagram of a heat exchanger of a combined cycle system illustrating auxiliary burning on the air side of the heat exchanger.

An embodiment of the invention which permits auxiliary firing without suffering heat transfer inefficiencies of heat exchanger 76 is shown in FIG. 11. A conventional auxiliary burner 178 is interposed in the stream of heated compressed air exiting heat exchanger 76. Since the additional heat from auxiliary combustion is not required to pass through heat exchanger 76, an improvement in efficiency of this portion of the system on the order of one-half to one percent may be experienced over the embodiment of FIG. 10. This improvement in efficiency is attained at the cost of adding combustion products to the air flow. The usual procedures for handling hot combustion gasses therefore must be applied to handling the output of auxiliary burner 178 in order to avoid damage to the associated air turbine. If the process using the output of the combined cycle system requires clean, hot, unvitiated air, this embodiment of the invention system is not appropriate.

Although the present invention has been described in the environment of a bottoming cycle for a gas turbine, it must be recognized that the performance and advantages of the air cycle thermodynamic conversion system detailed in this disclosure is applicable beyond the function of capturing heat energy from a gas turbine exhaust. The air cycle system is potentially valuable in recovering heat energy exiting any process wherein the heat energy is contained in a coolable media. For example, numerous chemical processes emit quantities of heated gas containing significant amounts of heat which may be recovered using the air cycle system of the present invention.

Referring again to FIG. 9, as indicated by a dashed line 180, the output of air turbine 172 may be passed through an intercooler 182 before being returned to the input of air compressor 154, thus forming a closed system. A closed system may be especially useful in certain ambient environments where equipment damage may be incurred by ingestion of environmental air. For example, an air environment containing abrasive particulates or corrosive chemical components may erode the rotating and/or stationary elements in the air path. Also, an air environment having a high water content may produce a troublesome quantity of condensed water.

The closed cycle obviates the problems of dirty, contaminated or humid air conditions by continuously recycling the air in the system. In addition, increased power output may be obtained by supercharging the closed system. That is, instead of limiting the inlet pressure of air turbine 172 to ambient pressure, conventional techniques (not shown) may be employed to permit a pressure increase at such inlet as well as a corresponding pressure increase throughout the closed system. The resulting increased air density throughout the closed system is capable of increasing the amount of work which the medium therewithin may perform for a given equipment capacity.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A thermodynamic conversion system for absorbing heat from a flow of heated gases from a gas turbine comprising:
   a gas turbine providing a flow of heated gases from the gas turbine exhaust;
   at least first and second air compressors for compressing ambient air;
   an intercooler between said at least first and second air compressors;
   said intercooler reducing a temperature of a first compressed air from said first air compressor to about ambient temperature before said first compressed air enters said second air compressor;
   a counterflow heat exchanger including means for transferring heat from said flow of heated gas turbine exhaust gases to a second compressed air from said second air compressor to produce a heated compressed air;
   at least one air turbine connected directly to the counterflow heat exchanger responsive to said heated compressed air to drive at least one of said first and second compressors;
   means for minimizing a temperature gradient across said heat exchanger including control means for controlling a flow of said second compressed air and said heated gases through said heat exchanger to values having substantially equal heat capacities;
   said heated compressed air including an excess of energy beyond that required by said at least one air turbine to drive said at least one of said first and second air compressors; and,
   means for delivering said excess of energy to a using process.

2. A thermodynamic conversion system according to claim 1 wherein said means for reducing a temperature includes an air flow from a stage of said first compressor stage.

3. A thermodynamic conversion system according to claim 1 further comprising:
   a temperature-control valve pair;
   said temperature-control valve pair including a control valve and a bypass valve;
   said control valve including means for controlling an amount of said second compressed air passing through said heat exchanger to produce a heated compressed air portion;
   said bypass valve including means for controlling an amount of said second compressed air bypassing said heat exchanger and passing directly to said at least one air turbine; and
   means for automatically coordinating said control valve and said bypass valve whereby a single control of said temperature-control valve pair is effective to exercise simultaneously control on said control valve and said bypass valve in opposite directions.

4. A thermodynamic conversion system according to claim 3 wherein said means for automatically coordinating includes a mechanical interconnection between said control valve and said bypass valve.

5. A thermodynamic conversion system according to claim 3 further comprising:
   a load-control valve pair;
   said load-control valve pair including a load control valve and a dump valve;
   said load control valve including means for controlling an amount of said heated compressed air portion passing to said air turbine;
   said dump valve including means for controlling a dump of a remainder of said heated compressed air portion; and
   second means for automatically coordinating said load control valve and said dump valve whereby a single control of load-control valve pair is effective to simultaneously exercise control on load control valve and dump valve in opposite directions.

6. A thermodynamic conversion system according to claim 1 further comprising:
   a load-control valve pair;
   said load-control valve pair including a load control valve and a dump valve;
   said load control valve including means for controlling an amount of said heated compressed air passing to said at least one air turbine;
   said dump valve including means for controlling a dump of a remainder of said heated compressed air; and
   means for automatically coordinating said load control valve and said dump valve whereby a single control of said load-control valve pair is effective to exercise simultaneously control on said load control valve and said dump valve in opposite directions.

7. A thermodynamic conversion system according to claim 1, further comprising an auxiliary burner effective to add additional heat to said heated compressed air.

8. A thermodynamic conversion system according to claim 7 wherein said auxiliary burner is disposed to add heat to said flow of heated compressed air downstream of said heat exchanger.

* * * * *